(12) United States Patent
Springer et al.

(10) Patent No.: US 12,032,727 B2
(45) Date of Patent: Jul. 9, 2024

(54) PROVIDING AUTOMATED PERSONAL PRIVACY DURING VIRTUAL MEETINGS

(71) Applicant: Zoom Video Communications, Inc., San Jose, CA (US)

(72) Inventors: Shane P. Springer, Manchester, MI (US); Alexander Waibel, Seattle, WA (US)

(73) Assignee: Zoom Video Communications, Inc., San Jose, CA (US)

( * ) Notice: Subject to any disclaimer, the term of this patent is extended or adjusted under 35 U.S.C. 154(b) by 239 days.

(21) Appl. No.: 17/732,708

(22) Filed: Apr. 29, 2022

(65) Prior Publication Data
US 2023/0351059 A1    Nov. 2, 2023

(51) Int. Cl.
*G06F 21/00* (2013.01)
*G06F 21/84* (2013.01)
*G10L 15/02* (2006.01)
*G10L 21/003* (2013.01)
*H04L 12/18* (2006.01)

(52) U.S. Cl.
CPC .............. *G06F 21/84* (2013.01); *G10L 15/02* (2013.01); *G10L 21/003* (2013.01); *H04L 12/1822* (2013.01); *H04L 12/1831* (2013.01)

(58) Field of Classification Search
CPC ....... G06F 21/84; G10L 15/02; G10L 21/003; G10L 21/06; H04L 12/1822; H04L 12/1831
See application file for complete search history.

(56) References Cited

U.S. PATENT DOCUMENTS

| | | | |
|---|---|---|---|
| 2011/0063440 A1* | 3/2011 | Neustaedter | H04N 7/147 348/143 |
| 2013/0073389 A1* | 3/2013 | Heath | G06Q 30/02 705/14.54 |
| 2013/0073473 A1* | 3/2013 | Heath | G06Q 30/0241 705/319 |
| 2016/0132608 A1* | 5/2016 | Rathod | H04W 4/21 707/722 |
| 2018/0350144 A1* | 12/2018 | Rathod | G06Q 20/3224 |
| 2022/0377280 A1* | 11/2022 | Lyons | H04L 9/0866 |
| 2023/0030230 A1* | 2/2023 | Lyons | H04L 63/08 |

* cited by examiner

*Primary Examiner* — Mahfuzur Rahman
(74) *Attorney, Agent, or Firm* — Kilpatrick Townsend & Stockton LLP

(57) ABSTRACT

Systems and methods for providing automated personal privacy during virtual meetings are provided herein. The method may include establishing, by a video conference provider, a video conference having a plurality of participants. The method may also include receiving, from a first client device associated with one of the plurality of participants, a first audio stream and a first video stream, and recording responsive to an indication from one of the plurality of participants, one or more audio or video streams within a recording. The method may include receiving, from the first client device, a personal privacy request. In response to the personal privacy request, the method may include modifying, by the video conference provider, at least one of the first audio stream or the first video stream in the recording and storing the least one of the first audio stream or the first video stream as modified to the recording.

20 Claims, 10 Drawing Sheets

PROVIDING AUTOMATED PERSONAL PRIVACY DURING VIRTUAL MEETINGS

FIELD

The present application generally relates to videoconferences and more particularly relates to systems and methods for providing automated personal privacy during virtual meetings.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
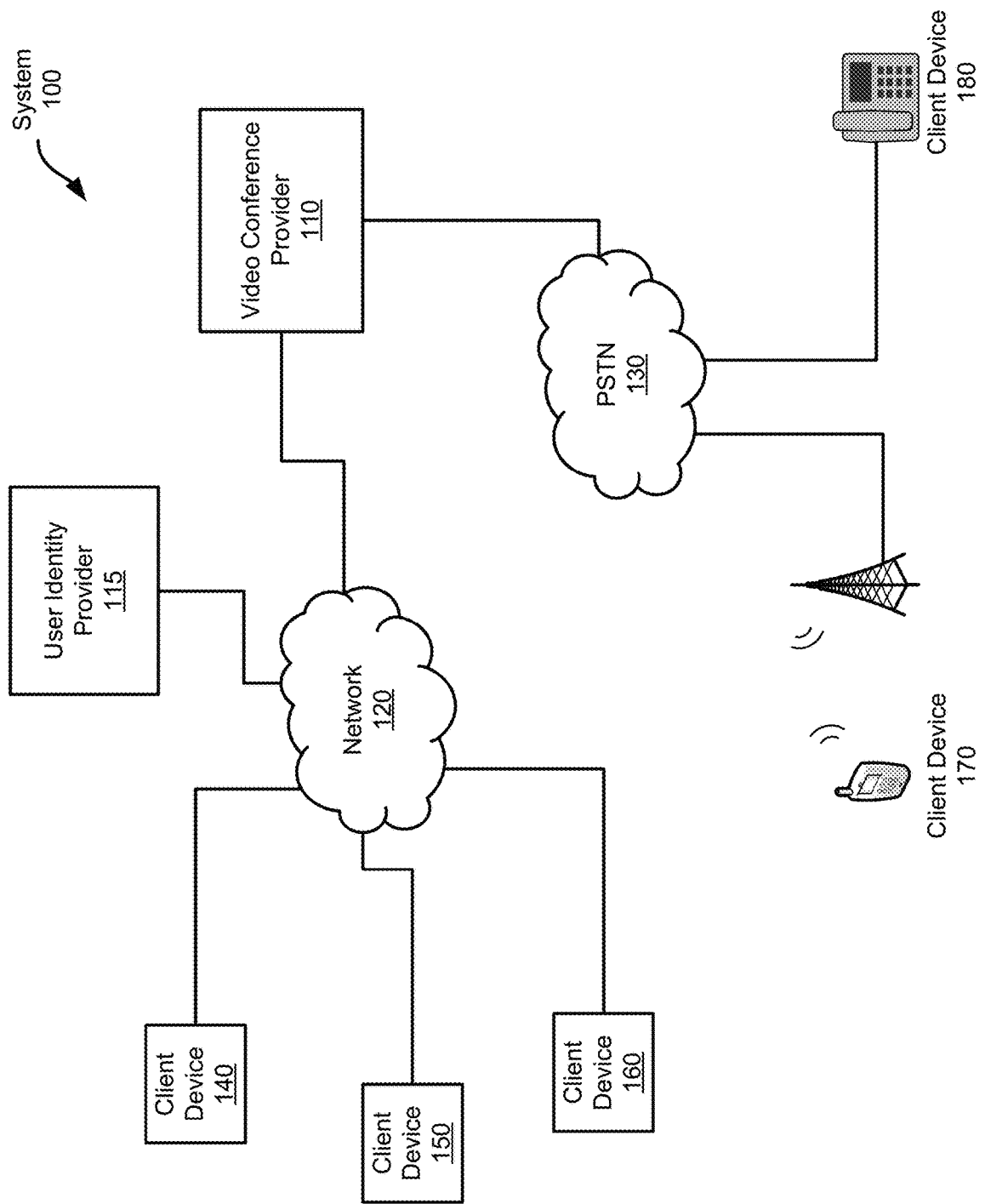
FIGS. 1, 2, and 3 show example systems for providing automated personal privacy during virtual meetings, according to an embodiment herein.

Examples are described herein in the context of systems and methods for providing automated personal privacy during virtual meetings. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conference providers can enable people to interact with each other using their own computers (or "client devices") with both video and audio in a variety of settings, such as in one-on-one conversations, group meetings, and webinars. While each of these types of settings can allow people to interact with each other, they can differ in character. For example, one-on-one conversations include only two people and may involve only a small amount of data being transmitted between the two client devices. Group meetings may involve a larger number of people all interacting with each other. In contrast, webinars typically involve a group of people that are attending to hear presentations from one or more presenters. Thus, in a webinar, interaction tends to be mostly one-way: from the presenter(s) to the audience. In addition, webinars can have very large numbers of participants, potentially numbering in the thousands or tens of thousands.

As the popularity of virtual meetings to replace conventional, in-person meetings, continues to rise, so too does the increase in privacy concerns for participants while in the virtual space. While participating in virtual meetings, participants generally have little control over their privacy, especially if a virtual meeting is being recorded. Conventionally, if a participant wants to join a virtual meeting that is being recorded, the participant must either consent to being recorded, by both audio streams and video streams, or leave the virtual meeting. While, in some circumstances, a participant may join a recorded meeting without video and choose to not speak during the meeting, the participant's personal information regarding his or her attendance is still associated with the recording. Moreover, attending the meeting in this manner diminishes the virtual meeting for the participant and leads to a less meaningful experience. Accordingly, there is a need for allowing participants to attend a recorded meeting while maintaining control over their privacy.

To provide virtual meeting participants with control over their personal privacy during a recorded meeting, systems and methods are provided herein for providing automated personal privacy during virtual meetings. Automatic personal privacy would allow a participant to control the level and/or degree to which personally identifiable information is recorded during a virtual meeting. Personally identifiable information may include information relating to the identity of the participant, such as, for example, his or her name, address, location, job position, credit card number, social security number, voice or speech characteristics, facial features, and the like. For example, a participant may modify his or her audio stream to mask his or her voice or speech pattern, or the participant may modify his or her video stream to blur his or her face in a virtual meeting recording. In other examples, the participant may completely remove his or her audio stream and video stream from the meeting recording. By providing the participant control over the degree to which personally identifiable information is recorded, the participant may fully engage in a recorded virtual meeting without concern about sharing personal information with individuals outside of the virtual meeting or individuals after the meeting. The systems and methods for providing automated personal privacy, as provided herein, can provide participants the confidence to fully engage with a virtual meeting without concerns of personal and private information being recorded.

This illustrative example is given to introduce the reader to the general subject matter discussed herein and the disclosure is not limited to this example. The following sections describe various additional non-limiting examples and examples of systems and methods for providing automated personal privacy during virtual meetings.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
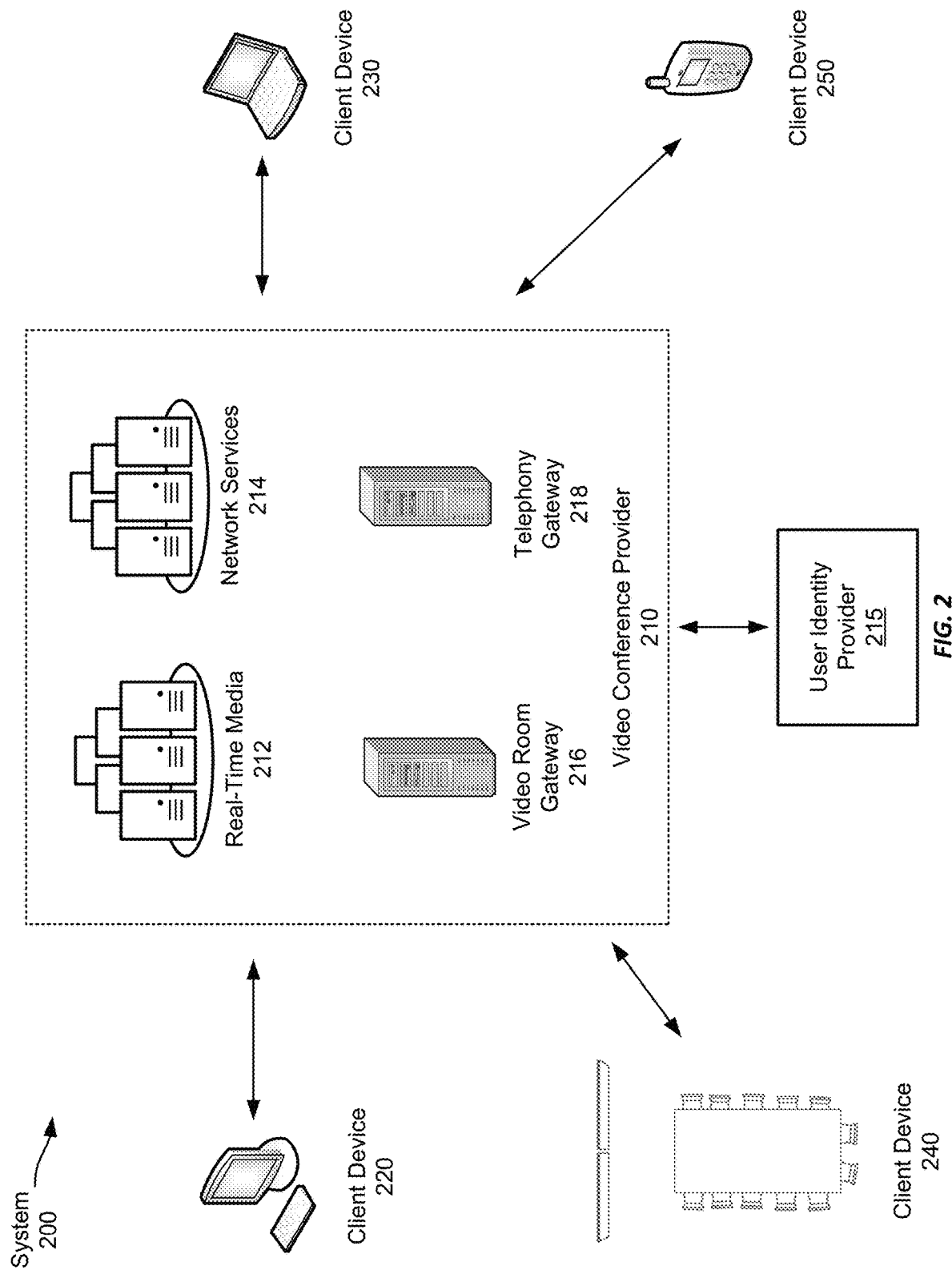

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different Examples of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210.

For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
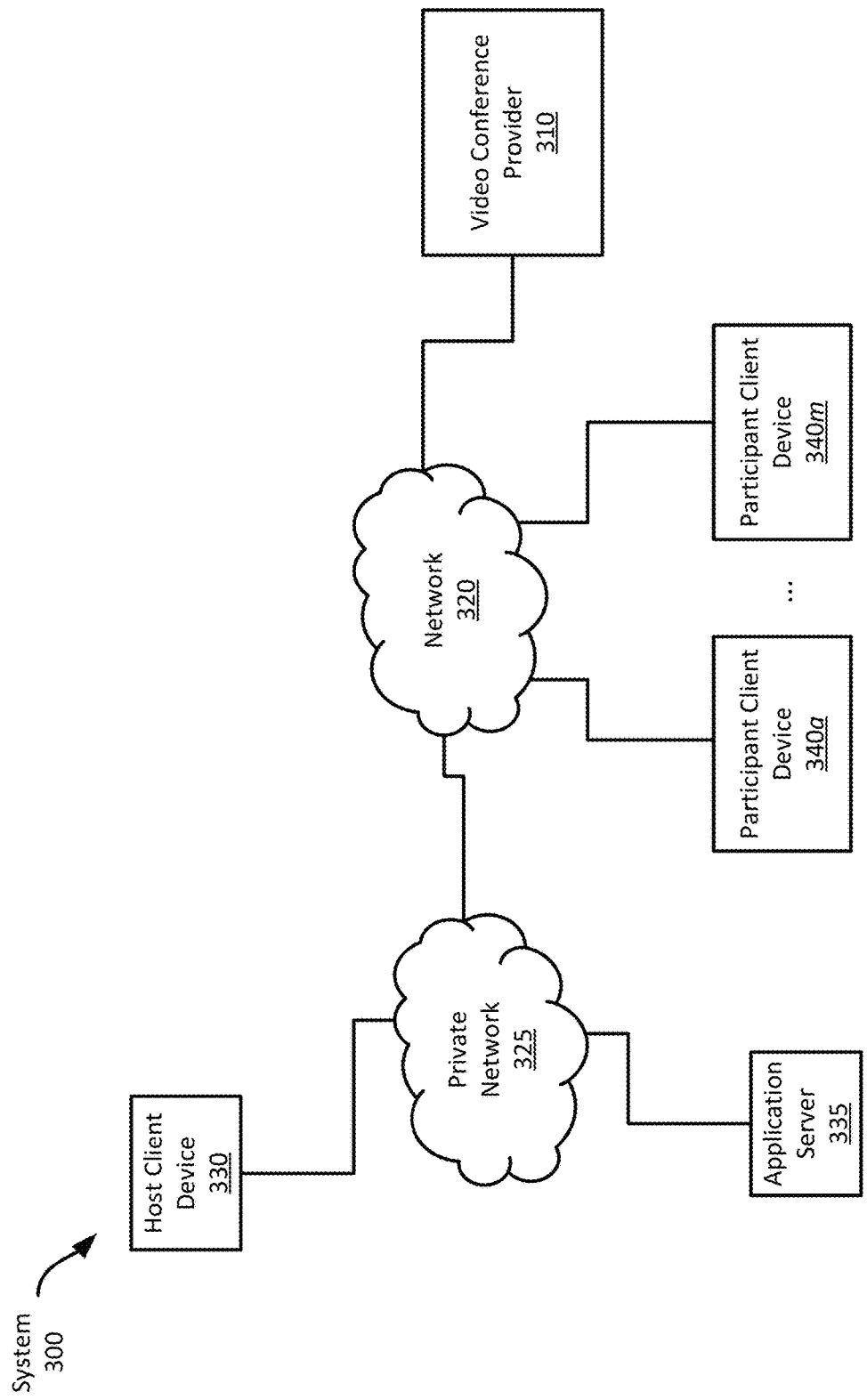

Referring now to FIG. 3, FIG. 3 shows an example system 300 for providing automated personal privacy or privatization functionality during a virtual meeting. In this example, a video conference provider 310 provides video conference services to multiple different client devices 330 and 340a-m, generally as described above with respect to FIGS. 1 and 2. In this example, the client devices 330 and 340a-m participate in a meeting hosted by the video conference provider 310. Client devices 340a-m connect to the video conference provider 310 over a public network 320, e.g., the internet; however, host client device 330 participates from within a private network 325, such as from their office at work. In addition to the host client device 330, an application server 335 is connected to the private network and makes various business applications available to the host client device 330. In different examples, these business applications may vary; however, in this example, the application server 335 provides applications to access business databases and files. To access these various resources, the host client device 330 has different client applications installed on it and may also have web applications accessible via a web browser, which may be stored as bookmarks in the web browser.

To start a meeting, the host client device 330 connects to the video conference provider 310 and begins a virtual meeting ("meeting") at the video conference provider 310, such as by beginning a scheduled meeting, generally as described above with respect to FIGS. 1 and 2. The video conference provider 310 may create and manage the meeting as discussed above.

Once the virtual meeting is started, participants may be able to interact with other participants and see their respective names, such as in close proximity to other participants' video streams or in a list of participants visible in a graphical user interface ("GUI"). In some embodiments, the participants may only be able to see information, e.g., names or video feeds, from the host(s) of the meeting or certain select participants that will be engaged in discussions during the virtual meeting, such as panelists in a panel discussion. Still other limits may be imposed on the various participants, such as their ability to react to occurrences during the meeting, e.g., participants may be allowed to interact with their GUI to raise their hand to ask a question, but may not be allowed to provide any other feedback.

During the meeting one of the participant client devices 340a-m or the host client device 330 may request to record the meeting. The request to record the meeting may be transmitted to the video conference provider 310. In some embodiments, the video conference provider 310 may prompt the non-requesting client devices with a notification that the meeting is going to be recorded. For example, if the host client device 330 requests to record the meeting, the participant client devices 340a-m may receive a notification that the meeting is going to be recorded. Once the recording request is accepted, the video conference provider 310 may record the audio and video streams from all of the client devices, 340a-m and 330, until the recording is terminated or the meeting is ended.

As noted above, under the conventional virtual meeting recording architectures, participants need to either accept being recorded or leave the meeting. That is, presently, if a meeting is being recorded, the audio and video streams from a client device, such as the participant client devices 340a-m, are recorded if the participant stays in the meeting, regardless of whether the respective participant wants to be recorded. Currently, there is no way for the participant to join and participate in a virtual meeting that is being recorded without his or her audio and video streams being recorded as well.

To provide virtual meeting participants the ability to join and participate in a recorded meeting without being recorded themselves at all times, privatization functionality for virtual meetings is provided herein. The privatization functionality may be automatically performed based on a participant's preferences and/or the meeting settings. The privatization functionality may provide virtual meeting participants control over their personal privacy when it comes to recordings. For example, a participant corresponding to the participant client device 340*a*, may want to participate in a virtual meeting, however, the participant may be uncomfortable with being recorded. The meeting, however, is being recorded for training and educational purposes. Under conventional video conferencing structures, the participant would be required to leave the meeting if he or she did not want to be recorded or have personally identifiable information present in the recording. The privatization functionality, however, provides the participant the ability to control what degree and how much of his or her private and personal information is present in the recording. As will be expanded on below, the participant may indicate that he or she would like his or her voice obscured or modified in a way that it is not personally identifiable to the participant. Similarly, the participant may indicate that he or she would like to obscure or modify his or her appearance such to no longer be personally identifiable to the participant. By allowing the participant to modify his or her appearance and/or voice in the recording, the participant can fully participate in the meeting without concern for personal privacy in the meeting.

To invoke the privatization functionality, a participant may request personal privacy for the recording. For example, upon receiving a notification that the meeting is being recorded, the participant client device 340*a* may provide a personal privacy request. The personal privacy request may be transmitted from the participant client device 340*a* to the video conference provider 310. Once the video conference provider 310 receives the personal privacy request, the video conference provider 310 may modify the audio and video streams from the participant client device 340*a*. The modified audio and video streams from the participant client device 340*a* may be modified for recording purposes only or they may be modified for the meeting (e.g., the other participants receive the modified audio and/or video stream(s)). At this time, the participant client device 340*a* is considered to be "privatized." However, in some examples, despite modifying the audio and video streams for the recording, the unaltered (e.g., unmodified) audio and video streams may be provided to the other participants in the video conference. Thus, the participants in the meeting may not be aware that the participant has requested privacy in the recording.

The arrangement of modified versus unmodified audio and/or video stream(s) for a privatized participant may vary depending on the preferences of the participant. Advantageously, a participant can determine whether to be privatized during the meeting such that the other meeting participants only receive the modified audio and/or video stream(s) or whether to only privatize the recording such that the other meeting participants receive the unmodified audio and/or video stream(s) but the recording, as saved, only includes the modified audio and/or video stream(s).

It should be understood that in some embodiments, privatization may include modification of the audio stream, of the video stream, or both the audio and video streams within the recording. The audio and/or video stream(s) may be modified as the meeting is being recorded, thus the recording as generated includes the modified streams. In other examples, the audio and/or video stream(s) may be recorded as unmodified but may be retroactively edited to a modified version. Once a participant requests privatization of his or her audio and/or video stream(s), the saved recording may only include the modified streams. Because the saved recording may not include the unmodified audio and/or video stream(s), the privatization functionality can provide the participant confidence that his or her personal privacy is secure.

In other embodiments, privatization may also include modification of non-audio or video content. For example, during privatization any chat messages, documents exchanged, or transcripts generated during the video conference may be modified to remove personally identifiable information associated with the requesting participant. In some embodiments, modification of the audio stream and/or the video stream within the recording may include erasing or removing the audio stream and/or video stream completely from the recording.

In some embodiments, the other participants in the virtual meeting may be notified or informed when a participant privatizes. For example, when the participant client device 340*a* request to be privatized, the participant client devices 340*b-m* and the host client device 330 may receive an indication or be otherwise notified that the recording will be modified pursuant to the participant client device 340*a*'s personal privacy request. This may aid in other participants confusion upon seeing a recording that has been modified based on a privatization request.

The privatization functionality may be invoked live or retroactively. In an example embodiment, a participant may request to be privatized during a live meeting that is being recorded. For example, the participant client device 340*a* may request to be privatized upon joining the video conference with the participant client devices 340*b-m* and the host client device 330. Based on this request, the video conference provider 310 may modify the audio stream and/or the video stream received from the participant client device 340*a* prior to transmitting the audio stream and/or video stream to the participant client devices 340*b-m* and the host client device 330. Instead, the video conference provider 310 would transmit a modified audio stream and/or a modified video stream from the participant client device 340*a* to the other meeting participants. The modified audio stream and/or the modified video stream would be modified based on the participant client device 340*a*'s personal privacy request to remove or modify personally identifiable information. The modified audio stream and/or the modified video stream would be included in the meeting recording in place of the original audio stream and/or unmodified video stream received from the participant client device 340*a*.

In an example embodiment, a participant may request to be privatized retroactively. For example, the participant client device 340*a* may request to be privatized in the recording of the meeting. The participant client device 340*a* may determine, after the meeting terminates, that he or she wishes to remain anonymous in the meeting recording. As such, the participant client device 340*a* may provide a personal privacy request to the video conference provider 310 indicating retroactive privatization. Based on the personal privacy request, the video conference provider 310 may modify the audio stream and/or video stream(s) associated with the participant client device 340*a* within the recording. For example, streams in the recording may be tagged according to the participant that originated the stream. The video conference provider 310 may thereby access the streams corresponding to the requesting participant, modify the stream data, and modify related information, such as some or all of the participant's personal information present in the recording, e.g., that was stored as part of the tag associated with the stream.

When a participant privatizes, the meeting participants may continue to exchange audio and video streams from the participant. Depending on the temporal character of the personal privacy request, the audio and video streams may be unmodified, such as in the case of a retroactive personal privacy request. In other embodiments, the audio and video streams may be modified when transmitted to the other meeting participants, such as in the case of a live personal privacy request.

Figure 4:
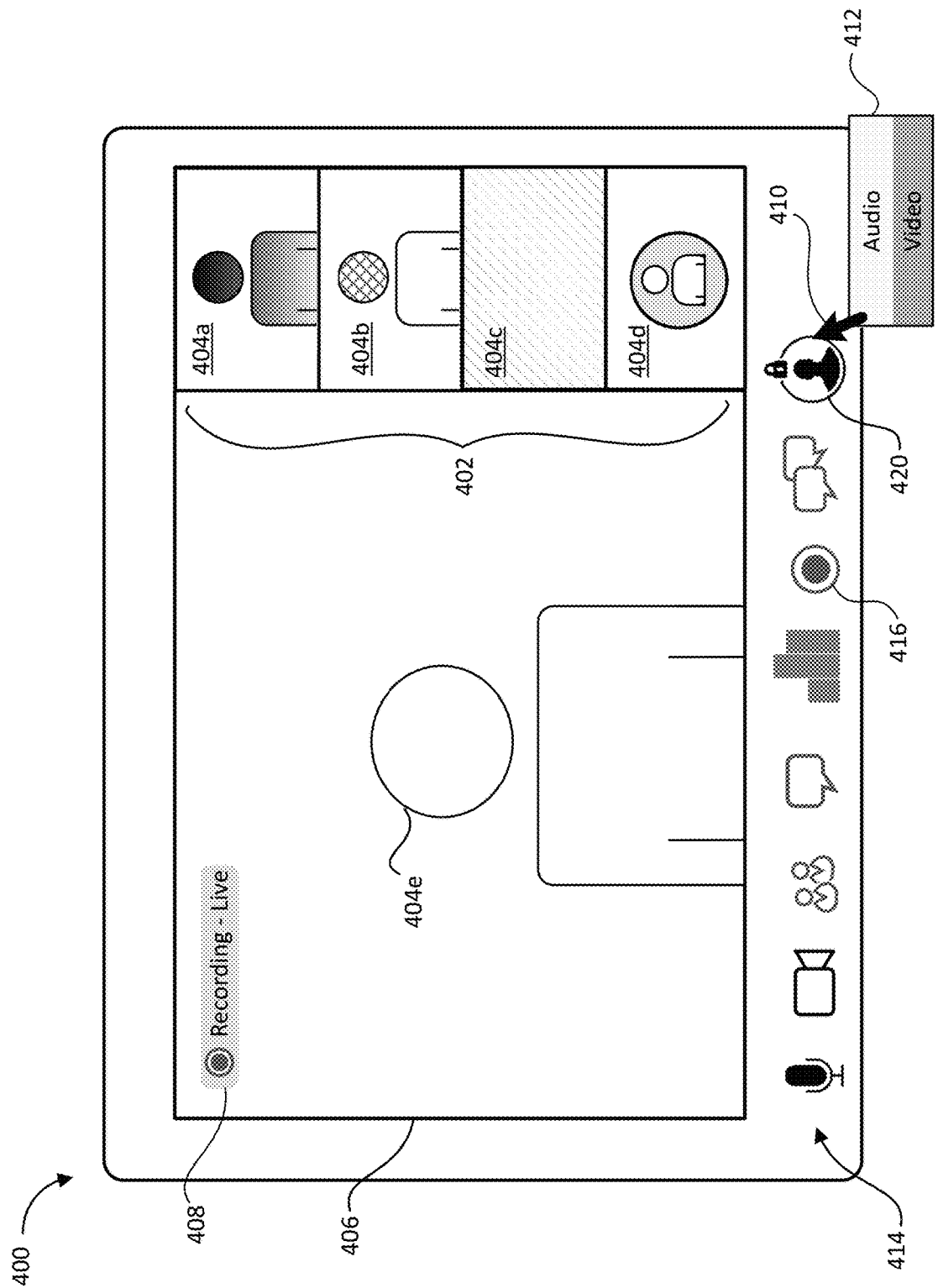
FIG. 4 illustrates a recording privatization prompt, according to an embodiment herein.

Referring now to FIG. 4, a GUI 400 during a virtual meeting being recorded is provided, according to an embodiment herein. The GUI 400 may be presented to a participant or a host during a virtual meeting. The following figures and related components, such as GUI 400 of FIG. 4, will be described with respect to the system shown in FIG. 3, however, any suitable system according to this disclosure may be employed, such as those described in FIGS. 1 and 2.

In some embodiments, a GUI 400 is viewable to a participant of the video conference on the participant's device, for example the GUI 400 may be viewable to participant A on the client device 340a. Presentation of the GUI 400 on the participant's device may be in response to the initiation of the virtual meeting.

The GUI 400 may include a roster 402 of the participants 404a-e in the video conference. The roster 402 may include a video stream of some or all of the participants 404a-e. In other embodiments, the roster 402 may include a picture, image, representation, avatar or a listing of some or all of the participants 404a-e who have joined the virtual meeting. When a participant joins the video conference, the joining participant is added to the roster 402.

Once the virtual meeting is initiated, video and audio streams may be exchanged between the participants 404a-e. Display 406 may display the video stream of a currently speaking participant 404e. The audio stream from participant 404e may also be transmitted along with the video stream. In some embodiments, more than one participant may be speaking, and in such cases, the display 406 may include two or more windows providing the video streams from the speaking participants.

The GUI 400 may also include a dashboard 414 containing one or more action selections. For example, the dashboard 414 may include a recording selection 416 that allows a participant to record the streams of audio and video during the video conference. To initiate recording of the virtual meeting, a participant may select the recording selection 416. The recording selection 416 may transmit a recording request to the video conference provider 310, which may transmit a notification or request to the other meeting participants, as noted above. If the recording request is accepted, then the meeting may be recorded. Upon recording, an indication 408 may be provided to indicate to the participants 404a-e that they are being recorded. The indication 408 may be helpful for the participants 404a-e to know that their audio and video streams are being recorded.

At some time after the virtual meeting is initiated, one or more of the participants 404a-e may wish to be privatized. For example, the participant 404a may wish to share personal information with the other participants of the virtual meeting. Due to the personal nature of the information, the participant 404a may not want to be associated with the personal information. For example, the virtual meeting may be a medical seminar and the participant 404a may want to ask a question to the other medical professionals on the meeting. The question, however, may be personal in nature and as such the participant 404a may desire to be privatized such that his or her personally identifiable information cannot be linked to the question.

To initiate privatization, the participant 404a may transmit a personal privacy request to the video conference provider 310. As illustrated, the dashboard 414 may include a personal privacy selection or button 420. In an example embodiment, the participant 404a may select the personal privacy selection 420 with his or her cursor 410.

In other embodiments, the personal privacy selection 420 may be provided as an option for the recording. For example, after the meeting terminates, the participant 404a may be able to select the meeting recording and be provided with the personal privacy selection 420. In some embodiments, upon selecting to retroactively privatize a meeting recording, the participant 404a may be prompted with a quick replay of the recording up until the privatization request or of the entire meeting. Using the prompt, the participant 404a can review and identify the exact timing at which the participant 404a wishes to be privatized. The quick replay is discussed in greater detail below with respect to FIG. 8.

Upon selecting the personal privacy selection 420, the participant 404a may be provided with a prompt 412. The prompt 412 may allow the participant 404a to select which streams the participant 404a would like to privatize. As shown, the prompt 412 may allow the participant 404a to select the audio stream and/or the video stream, meaning the participant 404a may privatize the audio stream, the video stream, or both the audio and video streams. It should be understood that the prompt 412 is a simplified example. In other embodiments, the prompt 412 may include a variety of privatization options, such as for example, privatizing the meeting transcript, chat messages, or any reference to the participant 404a within the meeting. The degree to which or the availability to privatize during a recorded meeting may be set by the meeting host or an assigned participant for a given meeting.

Figure 5:
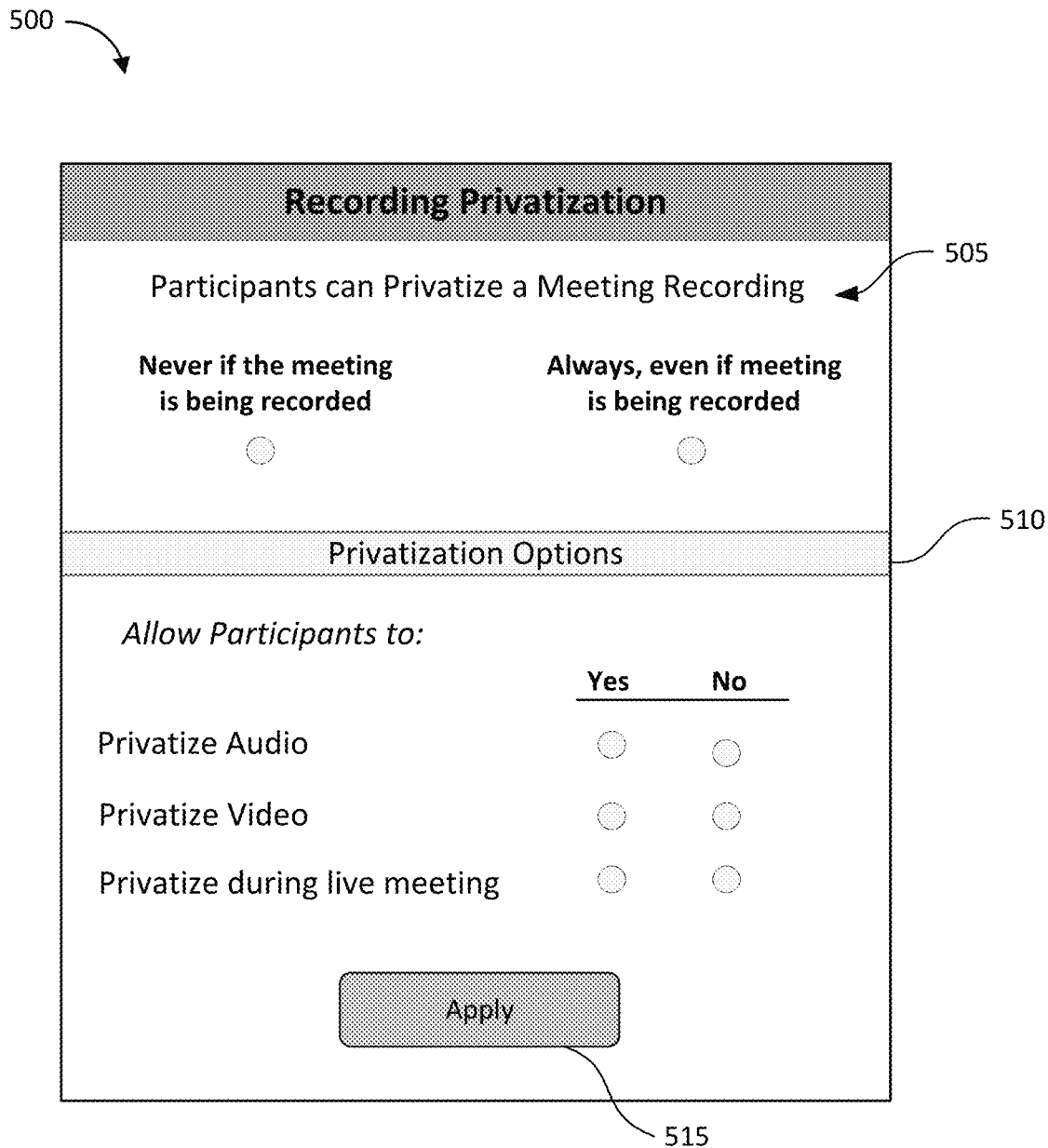
FIG. 5 illustrates a graphical user interface during a virtual meeting being recorded, according to an embodiment herein.

Turning now to FIG. 5, a recording privatization prompt 500 is provided, according to an embodiment herein. As shown, the recording privatization prompt 500 may include a pane 505. The pane 505 may provide the options to never allow privatization of a meeting recording or to always allow privatization during a meeting, even when recorded. In an example embodiment, the host may select the option to never allow privatization if the meeting is being recorded. For example, the meeting may be recorded for compliance purposes, and as such, privatization during the recorded meeting may not be allowed. As such, if the participant 404a makes a personal privacy request, the request may be automatically denied. In response to the personal privacy request, the participant 404a may receive a notification that the request is denied due to compliance purposes. In a contrasting embodiment, the host may select the option to always allow privatization even if the meeting is being recorded. In such embodiments, participants may invoke the privatization request, as discussed herein, throughout the meeting and/or retroactively after the meeting terminates.

The recording privatization prompt 500 may also include privatization options 510. The privatization options 510 may include options relating to the content that may be privatized and/or the degree to which privatization is allowed. It should be understood that the privatization options 510 is a simplified illustration and virtually any features relating to privatization may be provided as an option to allow or disallow on the recording privatization prompt 500.

As illustrated, the privatization options 510 may include an option to allow participants to privatize his or her respective audio stream and video stream. The privatization options 510 may also provide the option to allow the participants to privatize during a live meeting. For example, if "no" is selected for privatizing during a live meeting, the participants may only be allowed to be privatized in the meeting recording. During the meeting, however, the participants cannot modify his or her audio and/or video stream(s). Instead, the unmodified audio and video streams are transmitted to the plurality of meeting participants and the audio stream and/or video streams can only be modified (e.g., privatized) in the recording. If participants are allowed to privatize during a live meeting (e.g., live privatization), then the participants may request the privatization functionality during a live meeting as, for example, is illustrated in FIG. 4.

Once the desired recording privatization options are selected, button 515 may be selected to apply the privatization options to a respective meeting. In some embodiments, the options elected on the recording privatization 500 may carry over from meeting to meeting, while in other embodiments, the options may need to be selected for each respective meeting.

Returning now to FIG. 4, if the participant 404*a* selects to privatize the video stream, the video stream may be modified such to obfuscate one or more personally identifiable components of the video stream. For example, as illustrated, the face of the participant 404*a* may be obfuscated, such as by blurring, to minimize the visual personally identifiable traits of the participant 404*a*. As depicted by the video stream for the participant 404*c*, in some embodiments, the video stream may be modified to completely remove any trace of the participant 404*c* pursuant to a personal privacy request. In still further embodiments, the video stream may be replaced with a picture or icon pursuant to a personal privacy request, such as is illustrated for the participant 404*d*.

Privatization of a video stream may, in some embodiments, remove or obfuscate personally identifiable objects in the background of the video stream. For example, the participant 404*a* may be okay with being visible in the video stream, however, he or she may wish to obfuscate personally identifiable objects in his or her background. The participant 404*a* may have a bookshelf in his or her background that has family pictures on the shelves. As such, the participant 404*a* may indicate to obfuscate personally identifiable objects, including the family pictures, in his or her video stream. Based on this request, the privatization function may identify the personally identifiable objects in the participant's 404*a* background and obfuscate them. For example, the privatization function may blur the family pictures or may replace the images in the family pictures to landscape scenes. In another example, the personally identifiable objects may be books on a bookshelf. In such an example, the participant 404*a* may be an attorney and have a bookshelf full of law school books. The participant 404*a* may not wish to be identified as an attorney while attending a school board meeting. As such, the participant 404*a* may request to privatize the video stream background. Based on this request, the privatization function may identify the titles of the books on the bookshelf that are viewable in the background and blur or otherwise modify the titles.

Privatization of an audio stream may, in some embodiments, modify one or more personally identifiable characteristics of a participant's speech. For example, the participant may speak with a personally identifiable speech intonation. Based on this intonation alone, people may be able to identify the participant or identify characteristics of the participant (e.g., southern drawl). As such, the participant may request to privatize his or her audio stream. Other audible characteristics that may be modified based on a personal privacy request include speech pitch, speech pattern, accent, and speech vocabulary. Certain terms or set of vocabulary may be personally identifiable to a meeting participant. For example, words may be indicative of an accent or location associated with a participant. The terms "loo" or "quid" may be immediately identifiable with a British accent or location. As such, the privatization function may identify these terms and modify them in a participant's audio stream to a more neutral term, such as "bathroom" or "currency."

Figure 6:
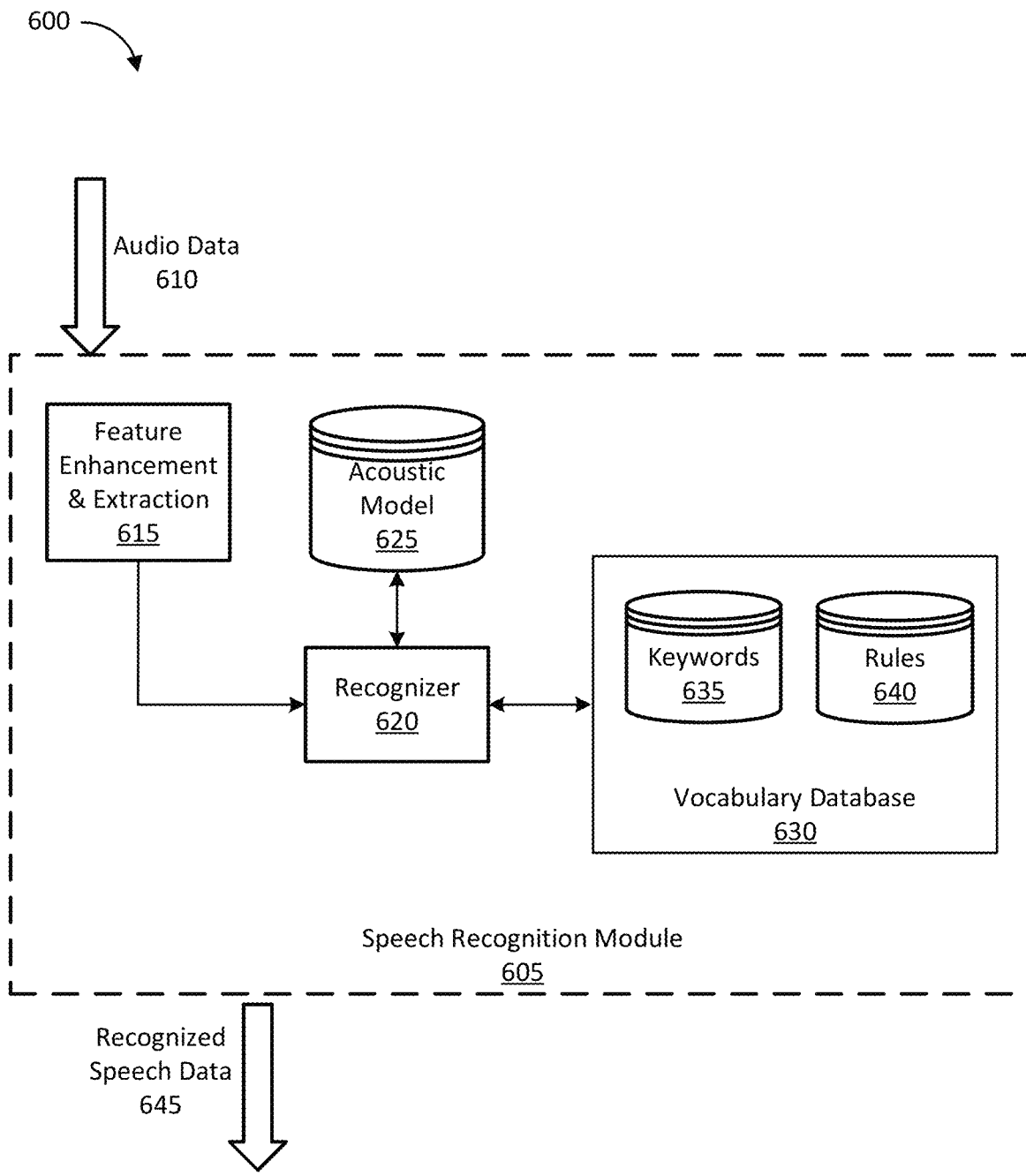
FIG. 6 illustrates an example speech recognition system that may be locally or remotely executed, according to an embodiment herein.

Turning now to FIG. 6, an example speech recognition system 600 that may be used to privatize an audio stream is provided. The speech recognition system 600 may be executed locally or remotely. For example, the speech recognition system 600 may be locally executed on a client device, such as the client device 340*a*, however, in other embodiments, the speech recognition system 600 may be cloud-based and/or remotely executed by a video conference provider, such as the video conference provider 310, or a third-party system.

Figure 7:
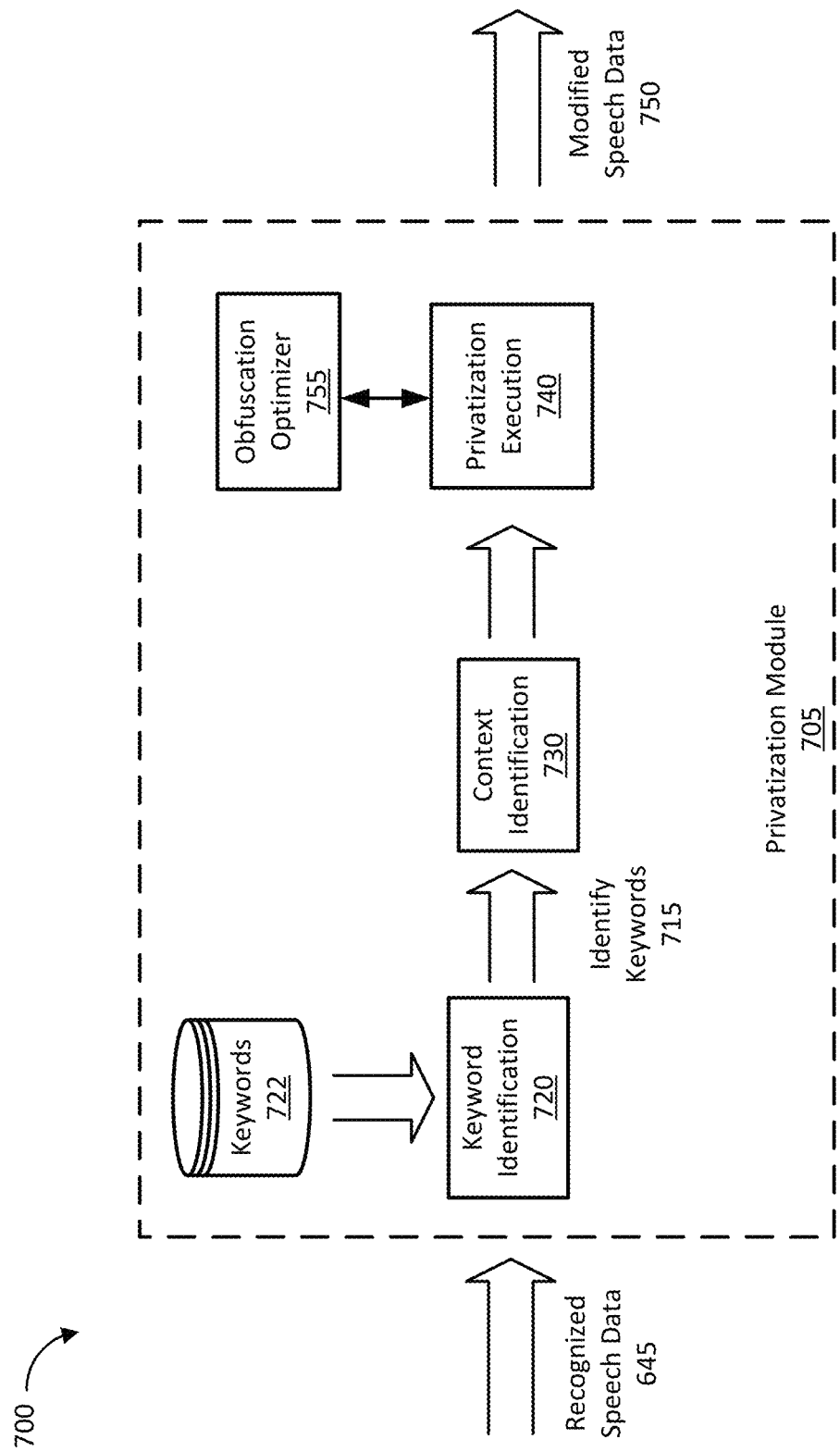
FIG. 7 illustrates an example privatization system that may be locally or remotely executed, according to an embodiment herein.

The speech recognition system 600, along with the privatization system 700 described in greater detail with respect to FIG. 7, may be used to perform a variety of privatization functions. For example, in some embodiments, the speech recognition system 600 may be used to perform privatization on a participant's audio stream in response to a personal privacy request from that participant. In other embodiments, the speech recognition system 600 may be used to identify personally identifiable information relating to a participant in the audio streams from the other meeting participants (e.g., remove references to the privatized participant made by the other participants). In still further embodiments, the speech recognition system 600 may be used to process the audio streams to generate a transcript of the meeting.

To perform speech recognition, the speech recognition system 600 may include a speech recognition module 605. The speech recognition module 605 may receive audio data 610. The audio data 610 may correspond to audio captured by the client device 340*a*, for example by a microphone. In other embodiments, the audio data 610 may be received from the video conference provider 310. The audio data 610 may be a recording of an audio stream or may be a transcript of the audio stream. The speech recognition module 605 may be or include a speech recognition system or model as known in the art. The following is an example speech recognition module following an example speech recognition process, however, it should be understood that other speech recognition modules or processes may be used.

Once the audio data 610 is received by the speech recognition module 605, the audio data 610 may be processed by a feature enhancement and extraction module 615. The feature enhancement and extraction module 615 may analyze the audio data for features corresponding to words and then enhance and extract any identified features. The identified features may correspond to audio waveforms present in human speech.

The speech recognition module 605 may also include a recognizer 620. The recognizer 620 may receive the identified features from the audio data 610. The recognizer 620 may employ an acoustic model 625 and a vocabulary database 630 to determine or associate the identified features in the audio data 610 to one or more words.

In an example embodiment, the acoustic model 625 may analyze the raw audio waveforms in the identified features and determine a corresponding phoneme for each waveform. In some embodiments, this is performed at the character, phoneme, or other subword level. The vocabulary database 630 may be a language model. The vocabulary database 630 may include a rules database 640 and a word database 635. The rules database 640 may provide various rules for speech, allowing the recognizer to discard any association of identified features (e.g., audio waveforms) to phonemes that are improbable given the constraints of proper grammar and the topic of discussion. Once an appropriate mapping of the identified features to phonemes is generated, the recognizer 620 may determine words associated with the phonemes. The words may be based on the words database 635.

Once the phonemes are associated with respective words, recognized speech data 645 is generated. It should be understood that this process may be performed nearly instantaneously. For example, the speech recognition module 605 may generate the recognized speech data 645 during the meeting as the audio streams are being received by the video conference provider 310 or another system that is hosting the speech recognition system 600. The recognized speech 645 may be then used to perform one or more privatization functions, such as recognizing a personal privacy request or privatizing an audio stream.

Turning now to FIG. 7, a privatization system 700 is provided. The privatization system 700 may include privatization module 705 that is used to perform one or more of the privatization functions described herein. For example, in one case, the recognized speech 645 may be received from the speech recognition system 600 to privatize the associated audio stream.

The recognized speech 645 may be received by the keyword identification system 720. The keyword identification system 720 may identify one or more keywords in the recognized speech data 745. The database of known keywords 722 may be queried to identify any keywords in the stream of recognized speech data 645. Keywords in the keyword database 722 may be based on the participant for which the privatization functionality is being invoked. For example, if the privatization functionality is invoked for the client device 340a, then the keywords in the keyword database 722 may relate to or be based on participant A, who corresponds to the client device 340a. The keywords may include words relating to the identity of participant A or personally identifiable information about participant A, such as the first and last name of participant A. In some cases, the keywords may include an office or location of participant A. Other keywords may include the names of projects, areas, or topics that participant A is involved in. In some embodiments, keywords may include one or more emotion expressions, such as a distinct laughter, or identifiable speech characteristics, such as an accent.

The keywords in the keyword database 722 may be gathered from participant A or from the client device 340a. For example, upon enabling the privatization functionality, participant A may be prompted to input personally identifiable keywords that the privatization module 705 should monitor the virtual meeting for (e.g., nickname). In other embodiments, the privatization module 705 may receive some or all the keywords from the participant's profile with the video conference provider 310. In still other embodiments, the privatization module 705 may gather keywords from applications on the client device 340a. If the privatization module 705 has permission to search other applications on the client device 340a, the privatization module 705 may gather keywords from folders, calendars, emails, or other applications running on the client device 340a.

It should be understood that a keyword may include more than one word. For example, "Project Alpha" may be a "keyword" as indicating that the phrase "Project Alpha" is a personally identifiable characteristic for participant A. Depending on various implementations, multi-word keywords may be treated as a single keyword or as multiple associated keywords. Further, a keyword may have multiple different forms. For example, a keyword may be a verb, which may be spelled different depending on context, e.g., it is conjugated differently depending on tense, subject, etc. Thus, a keyword may include variants of a base word, e.g., "look for," "looking for," and "looked for." In some examples each of these may be a distinct keyword, while in other examples, the variants may be associated with a base term, e.g., "look," that is used as the keyword. However, any suitable approach to recognizing keywords may be used.

If one or more keywords 715 is recognized, the privatization module 705 then may identify a context 730 associated with the keyword 715. In this example, to identify a context, the privatization module 705 may employ a trained machine learning ("ML") technique to semantically analyze the speech or transcript associated with the identified keyword 715 to determine additional related keywords and/or descriptors. To perform the analysis, the trained ML technique may be provided the keyword(s) and a predetermined number of words near the keyword, e.g., preceding and following the keyword(s), such as five to ten words preceding and following the keyword(s). Words such as articles (e.g., "a", "the") or prepositions such as "of" or "for" may be omitted from the word count in some examples.

The ML technique may receive the sequence of words and determine whether a personal privacy request was intended. For example, in an embodiment where the privatization function is invoked audibly by a participant, if the participant says "Let's keep this confidential," the ML technique may semantically analyze the words and determine that the speaker is requesting to privatize. Similarly, if the speaker says "Please keep this between you and me," the ML technique can semantically analyze and determine that the speaker is intending a personal privacy request. Alternatively, if the speaker says "I liked the movie Spenser Confidential" the ML technique may determine that no personal privacy request was intended and refrain from alerting the video conference provider 310 of the personal privacy request.

While ML techniques may be employed in some examples, other examples of context identification 730 functionality may perform word searches for personal privacy request words or phrases within a predetermined number of words from the identified keyword(s) 715. For example, considering the example above where the speaker says "Let's keep this confidential," the context identification may perform a search for certain words preceding "confidential", such as "Let's," "keep," etc. If one of those words is found preceding "confidential" by a predetermined number of words, the context identification 730 functionality may determine that the term "confidential" was meant as a personal privacy request.

Since people may use jargon or colloquial terms to refer to particular actions, the context identification 730 functionality may normalize recognized words to specific meanings.

For example, the terms "confidential," "private," "between you and me," "on the down low," etc. all refer to keeping information undisclosed. Thus, the context identification 730 functionality may map such terms to have a single meaning (e.g., private). Such mappings may be provided for multiple different phrases and corresponding terms. Similarly, synonyms or words related to keywords may also be identified.

Once the context identification 730 has identified the one or more keywords 715 and identified the context of the identified keywords 715, the privatization module 705 may perform a personal privacy execution 740. The privatization module 705 may determine, based on the identification of the keywords 715, and the context of the keywords, that participant A is making a personal privacy request. The personal privacy request 840 may communicate with the video conferencing software to start modifying the requested content (e.g., audio stream and/or video stream). In some embodiments, participant A may receive a prompt indicating that the personal privacy request has been identified and ask if participant A would like to privatize the live meeting or retroactively privatize the recording. In other embodiments, privatization of a participant's audio and/or video stream(s) may automatically start upon identification of a personal privacy request. The privatization module 705 may transmit instructions to the video conferencing software, or initiate instructions within the video conferencing software if the privatization module 705 is part of the video conferencing software, to provide a notification of the personal privacy request to the participant.

As noted above, in some embodiments, the speech recognition system 600 and the privatization system 700 may be used to privatize an audio stream for a participant. In such examples, the audio data from the audio stream may be modified such to change personally identifiable characteristics of the participant's speech. To modify the audio data, an obfuscation optimizer 755 may be applied to the recognized speech data 645, including the identified keywords 715. The obfuscation optimizer 755 may modify one or more speech characteristics identified in the recognized speech data 645 and/or the keywords 715 to obfuscate any personally identifiable information. For example, the obfuscation optimizer 755 may modify a speech pattern or speech pitch of the recognized speech data 645. In some embodiments, the obfuscation optimizer 755 may randomly modify the identified speech characteristic, while in other embodiments the obfuscation optimizer 755 may use an optimization algorithm to optimize the obfuscation. Optimization of speech characteristic obfuscation may include modifying the speech characteristic such that the modification is untraceable or not reversible. In some embodiments, the obfuscation optimizer 755 may use a neural network model to maximize the difference between the original content and the modified content. Optimization of the speech characteristic obfuscation may also include modifying the speech characteristic to a contrasting point. For example, if the speech characteristic is for high pitch speech, then optimization may include modifying the speech characteristic to low pitch speech.

In some embodiments, the obfuscation optimizer 755 may modify the vocabulary of the recognized speech data 645. For example, using the keywords 715 the obfuscation optimizer 755 may modify or change personally identifiable vocabulary in the recognized speech data 645 to neutral terms. Following the example provided above, if the keywords 715 include the term "quid" and "quid" is determined to be personally identifiable to the privatized participant because it indicates a British component to the participant, then the obfuscation optimizer 755 may change the term "quid" in the recognized speech data 345 to a more neutral synonym, such as for example, "currency," "money," or "dollar."

In another embodiment, the obfuscation optimizer 755 may identify any reference to a privatized participant and modify the reference to a neutral name. For example, if the privatized participant is addressed by his name "Christopher," then the obfuscation optimizer 755 may identify the name "Christopher" and modify it to another name, such as for example "James," or to a generic identifier, such as "Participant A." In some embodiments, the obfuscation optimizer 755 may query a nickname database (not shown) to be able to identify a nickname used for a privatized participant. For example, if the privatized participant is addressed "Chris" then the obfuscation optimizer 755 may identify "Chris" as referring to the privatized participant. In some embodiments, the obfuscation optimizer 755 may use machine learning to identify nicknames. The machine learning may gather data based on which participant responds when a nickname is spoken. Nicknames identified by the machine learning algorithm may be added to a nickname database.

After privatization the recognized speech data 645, the privatization module 705 may transmit the modified speech data 750 to the video conference provider 310. Depending on the timing of the personal privacy request, the modified speech data 750 may be used to transmit a modified audio stream to the plurality of participants (in the case of live privatization), saved as modified audio stream in the recording (in the case of retroactive privatization), or used to generate or modify the meeting transcript.

The privatization system 700 may be used to generate a transcript and/or edit a transcript of the meeting recording. When a participant's audio stream is privatized or the participant requests to privatize any audible personally identifiable content within the other audio streams (e.g., another participant addresses the privatized participant by name), a corresponding transcript may include a modified transcript in which personally identifiable characteristics of the requesting participant are modified or removed. As noted above, in some embodiments, this may occur retroactively. In such cases, the transcript may be analyzed and any personally identifiable content in the transcription corresponding to the privatized participant's audio stream may be modified or removed in the transcript. In still further embodiments, such as those where the participant requests to be anonymous during the meeting and on the transcription, the privatization system 700 may identify and remove any personally identifiable information corresponding to the participant. For example, the keyword identification 720 and the context identification 730 may be used to identify keywords and context within a transcript that correspond to personally identifiable information of the participant A. Once identified, the privatization system 700 may remove the personally identifiable content from the transcript.

In some embodiments, the privatization function provided herein may be a filter that can be applied to a recording after the meeting is terminated. In other embodiments, the privatization function may identify segments of the meeting recording in which content relating to the privatized participant is identified and provide the privatized participant the ability to review the identified content.

Figure 8:
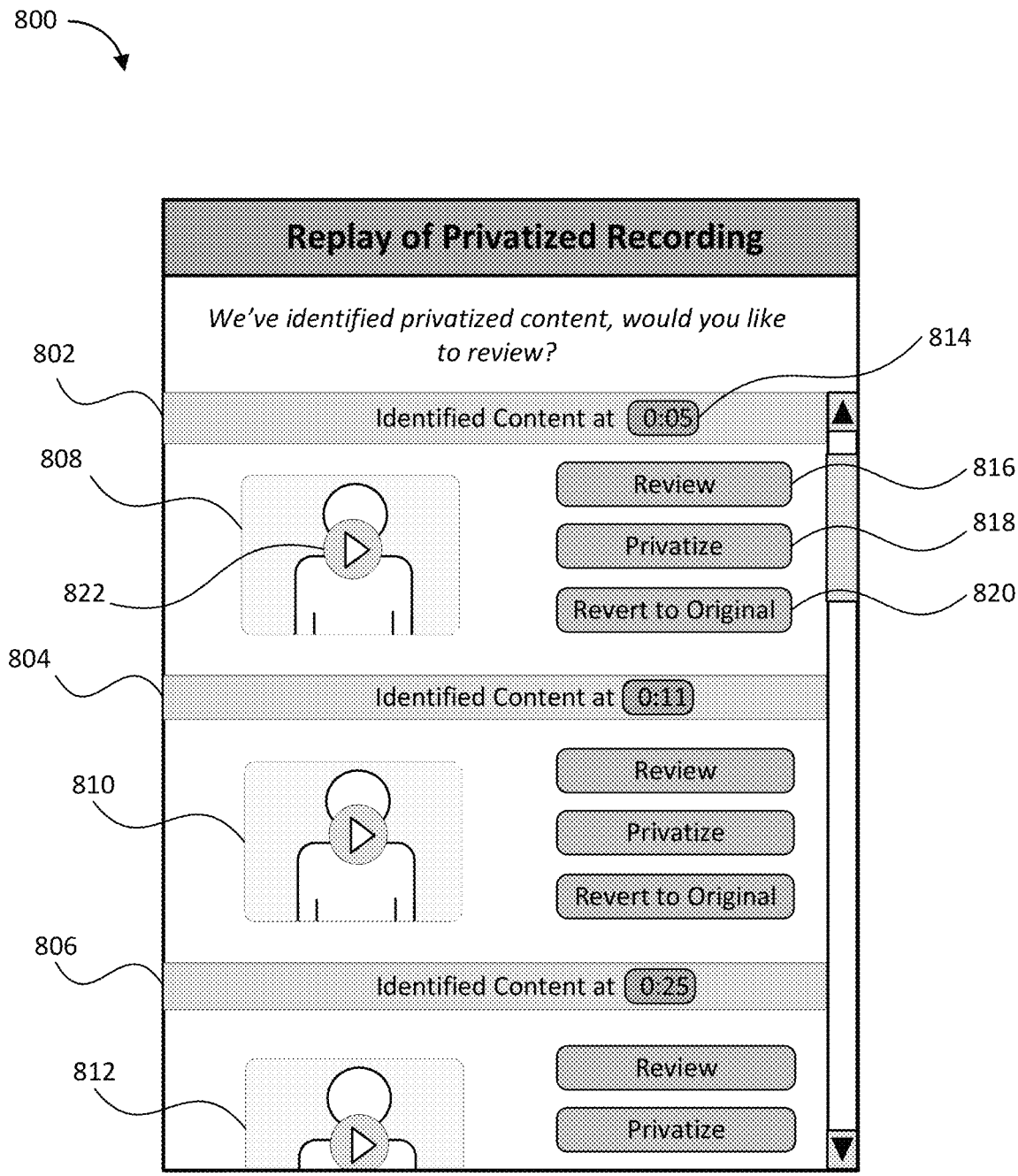
FIG. 8 illustrates an instant replay prompt for reviewing privatized content in a recording, according to an embodiment herein.

Referring now to FIG. 8, an instant replay prompt 800 for reviewing privatized content in a recording is provided, according to an embodiment herein. The instant replay prompt 800 may be provided to a participant after the participant makes a retroactive privatization request. In other embodiments, the instant replay prompt 800 may be provided automatically to a participant after the meeting terminates. The instant replay prompt 800 may be provided nearly instantaneously to allow for quick review of identified content and/or privatized content by a participant.

The instant replay prompt 800 may include segments of the recording in which personally identifiable content corresponding to the participant is identified. For example, as illustrated, identified content panes 802, 804, and 806 may be provided to the participant. The identified content panes 802, 804, and 806 may include a segment of the recording 808, 810, and 812, respectively, in which personally identifiable content is identified. The personally identifiable content may be an audio and/or video stream of the participant or may include another participant talking to the participant, such as, for example addressing the participant by name.

In other embodiments, the identified content panes 802, 804, and 806 may include modified recording segments in which the privatization function is already applied. For example, the privatization functionality may be automatically applied to the recording once personally identifiable content is identified. The instant replay prompt 800 may provide the participant a quick review of the modified (e.g., privatized) content to verify that the privatization is correct.

Each of the identified content panes 802, 804, and 806 may include a time 814 at which the content is identified. For example, the personally identifiable content in the identified content pane 802 is identified at five minutes into the meeting recording, according to the time 814. The identified content panes 804 and 806 provide personally identifiable content identified at 11 minutes and 25 minutes into the recording, respectively.

Beyond identifying recording segments that include personally identifiable content and the timing at which the segments occur, the identified content panes 802, 804, and 806 may provide a review selection 816, a privatize selection 818, and a revert to original selection 820. For example, the participant can select the recording segment 808 and select the review selection 816. The review selection 816 may allow the participant to review the recording segment 808. The participant may also select the play button 822 on the recording segment 808 to review the recording segment 808.

Upon reviewing the recording segment 808 the participant may determine that he or she would like to privatize the content in the recording segment 808. To privatize the content, the participant may select the privatize selection 818. The privatize selection 818 may then privatize the identified content in the recording segment 808 according to the participant's preferences. For example, the privatize selection 818 may, once selected, further prompt the participant to select various privatization options, such as privatizing the audio stream, video stream, both audio and video streams, removing one or both of the streams completely from the recording, etc.

In some embodiments, after privatizing the recording segment 808, the participant may review the modified content. Upon review, the participant may determine that he or she prefers the non-privatized content. As such, the participant may select the revert to original selection 820 and the recording segment 808 may be reverted back to an unmodified state.

As is illustrated by the instant replay prompt 800, in some embodiments, a participant can choose to privatize only segments of the recording or the meeting, instead of privatizing the entire recording/meeting. For example, the participant may remain non-privatized for the duration of the meeting until the Questions and Answers ("Q&A") portion of the meeting. At this point, the participant may desire to be privatized to ask a personal question without being personally identifiable. As such, the participant may make a personal privacy request once the Q&A starts but remain fully identifiable for the other portion of the meeting. In such a scenario, the meeting recording may include the non-privatized audio and video streams from the participant during the meeting except for the time period of the recording corresponding to the Q&A. During the time period corresponding to the Q&A, the audio and/or video stream(s) corresponding to the participant may be modified based on the personal privacy request.

Figure 9:
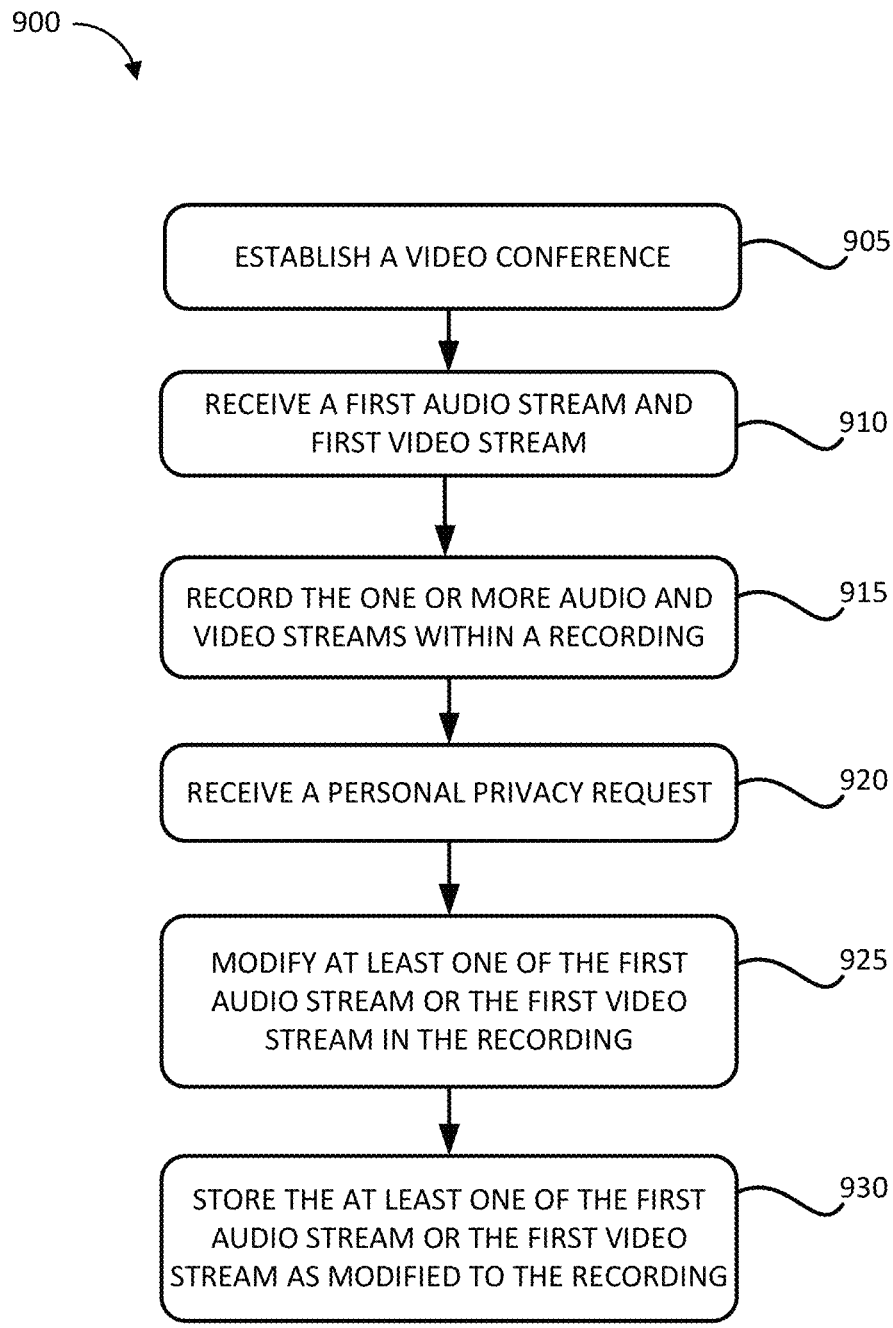
FIG. 9 illustrates an exemplary method for providing automated personal privacy during virtual meetings, according to an embodiment herein.

Referring now to FIG. 9, a flowchart of an example method 900 for providing automated personal privacy during virtual meetings is provided. The description of the method 900 in FIG. 9 will be made with reference to FIGS. 3-8, however any suitable system according to this disclosure may be used, such as the example systems 100 and 200, shown in FIGS. 1 and 2.

The method 900 may include a step 905. At step 905, a video conference provider, such as the video conference provider 310, may establish a video conference. The video conference may include a plurality of participants, such as the participants associated with the participant client devices 340*a-m*. Each participant of the plurality of participants may exchange one or more audio and video streams via the video conference.

The method 900 may include step 910. At step 910, a first audio stream and a first video stream from a first client device may be received. For example, the video conference provider 310 may receive a first audio stream and a first video stream from the participant client device 340*a*. The first client device may be associated with one of the plurality of participants in the video conference.

At some point during the video conference, one of the plurality of participants may request to record the video conference. At step 915, the method 900 may include recording, responsive to an indication from one of the plurality of participants, the one or more audio and video streams within a recording. The method 900 may also include step 920, at which a personal privacy request may be received from the first client device. For example, a participant associated with the first client device may select the personal privacy button/selection 420. In another example, the receiving, from the first client device, the personal privacy request may include identifying, based on the first audio stream, one or more keywords indicating the personal privacy request. For example, the video conference provider 310 or another third party, may perform speech recognition on the first audio stream and determine, based on the speech recognition, the one or more keywords indicating the personal privacy request.

The method 900 may also include step 925. At step 925, the method 900 may include modifying, in response to the personal privacy request, at least one of the first audio stream or the first video stream in the recording. For example, the method 900 may include modifying, by the video conference provider, at least the first audio stream or the first video stream during the video conference and generating, by the video conference, a modified audio stream based on the first audio stream or a modified video stream based on the first video stream. In such examples, the method 900 may also include transmitting, by the video conference provider, the modified audio stream and/or the modified video stream as the first audio stream and the first video stream to the plurality of participants during the video conference. In some embodiments, generating the modified audio stream and/or the modified video stream may include obfuscating, by the video conference provider, one or more personally identifiable characteristics of the first audio stream and/or obfuscating, by the video conference provider, one or more personally identifiable objects in the first video stream. For example, obfuscating the one or more personally identifiable objects in the first video stream may include blurring a face of a first participant associated with the first client device in the first video stream, and obfuscating the one or more personally identifiable characteristics of the first audio stream may include modifying at least one of a speaker's intonation, a speaker's pitch, a speaker's speech pattern, or a speaker's vocabulary.

The method 900 may also include storing the at least one of the first audio stream or the first video stream as modified to the recording at step 930. For example, the recording may include the modified audio stream and/or the modified video stream as the first audio stream and the first video stream.

Figure 10:
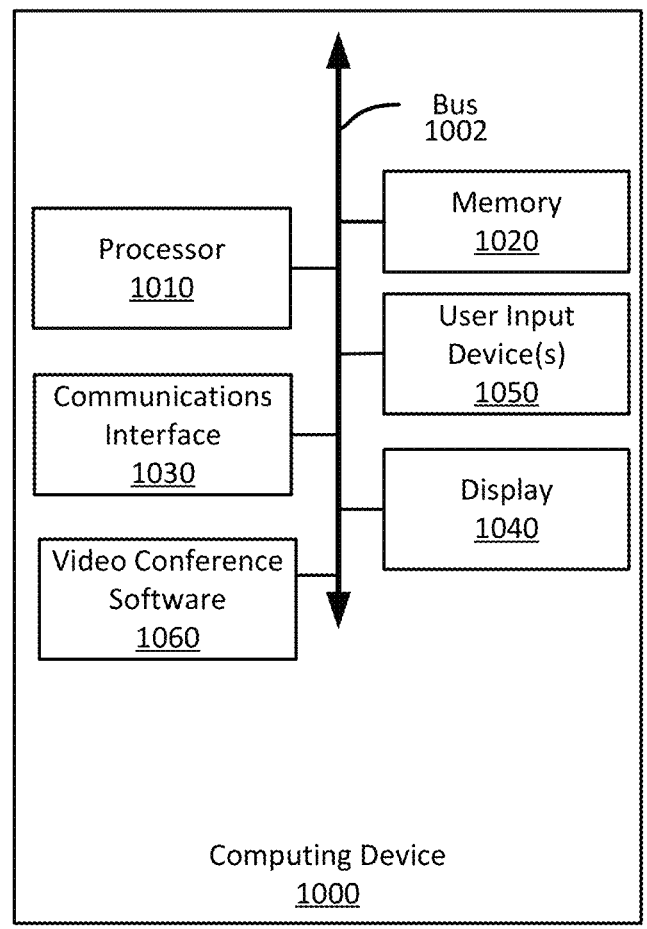
FIG. 10 shows an example computing device suitable for providing automated personal privacy during virtual meetings, according to this disclosure.

Referring now to FIG. 10, FIG. 10 shows an example computing device 1000 suitable for use in example systems or methods providing automated personal privacy during virtual meetings. The example computing device 1000 includes a processor 1010 which is in communication with the memory 1020 and other components of the computing device 1000 using one or more communications buses 1002. The processor 1010 is configured to execute processor-executable instructions stored in the memory 1020 to perform one or more methods for providing automated personal privacy during virtual meetings, such as part or all of the example method 900, described above with respect to FIG. 9. The computing device, in this example, also includes one or more user input devices 1050, such as a keyboard, mouse, touchscreen, video input device (e.g., one or more cameras), microphone, etc., to accept user input. The computing device 1000 also includes a display 1040 to provide visual output to a user.

The computing device 1000 also includes a communications interface 1030. In some examples, the communications interface 1030 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification As used below, any reference to a series of examples is to be understood as a reference to each of those examples disjunctively (e.g., "Examples 1-4" is to be understood as "Examples 1, 2, 3, or 4").

Example 1 is a system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: establish a video conference having a plurality of participants, each participant of the plurality of participants exchanging one or more audio or video streams via the video conference; receive, from a first client device associated with one of the plurality of participants, a first audio stream and a first video stream of the one or more audio or video streams; record, responsive to an indication from one of the plurality of participants, the one or more audio or video streams within a recording; receive, from the first client device, a personal privacy request; in response to the personal privacy request, modify at least one of the first audio stream or the first video stream in the recording; and store the at least one of the first audio stream or the first video stream as modified to the recording.

Example 2 is the system of any previous or subsequent example, wherein the processor-executable instructions to modify the at least one of the first audio stream or the first video stream in the recording further cause the processor to execute further processor-executable instructions stored in the non-transitory computer-readable medium to: modify the first video stream after being stored in the recording.

Example 3 is the system of any previous or subsequent example, wherein the processor-executable instructions to modify the first video stream in the recording further cause the processor to execute further processor-executable instructions stored in the non-transitory computer-readable medium to: obfuscate one or more objects in the first video stream on the recording.

Example 4 is the system of any previous or subsequent example, wherein the processor-executable instructions to modify the at least one of the first audio stream or the first video stream in the recording further cause the processor to execute further processor-executable instructions stored in the non-transitory computer-readable medium to: erase the first audio stream from the recording.

Example 5 is the system of any previous or subsequent example, wherein the processor-executable instructions to modify the at least one of the first audio stream or the first video stream in the recording further cause the processor to execute further processor-executable instructions stored in the non-transitory computer-readable medium to: cease recording the first audio stream in the recording during the video conference.

Example 6 is the system of any previous or subsequent example, wherein the processor-executable instructions to modify the at least one of the first audio stream or the first video stream in the recording further cause the processor to execute further processor-executable instructions stored in the non-transitory computer-readable medium to: apply an audio obfuscation optimizer to the first audio stream to change at least one characteristic of the first audio stream.

Example 7 is the system of any previous or subsequent example, wherein the at least one characteristic of the first audio stream comprises at least one of: speech intonation; speech pitch; speech pattern; or speech vocabulary.

Example 8 is a method comprising: establishing, by a video conference provider, a video conference having a plurality of participants, each participant of the plurality of participants exchanging one or more audio or video streams via the video conference; receiving, from a first client device associated with one of the plurality of participants, a first audio stream and a first video stream of the one or more audio or video streams; recording, by the video conference provider, responsive to an indication from one of the plurality of participants, the one or more audio or video streams within a recording; receiving, from the first client device, a personal privacy request; in response to the personal privacy request, modifying, by the video conference provider, at least one of the first audio stream or the first video stream in the recording; and storing the least one of the first audio stream or the first video stream as modified to the recording.

Example 9 is the method of any previous or subsequent example, the method further comprises: modifying, by the video conference provider, the first video stream during the video conference; and generating, by the video conference provider, a modified audio stream based on the first audio stream and a modified video stream based on the first video stream.

Example 10 is the method of any previous or subsequent example, further comprising: transmitting, by the video conference provider, the modified audio stream and the modified video stream as the first audio stream and the first video stream to the plurality of participants during the video conference.

Example 11 is the method of any previous or subsequent example, wherein generating, by the video conference provider, the modified audio stream and the modified video stream comprises: obfuscating, by the video conference provider, one or more personally identifiable characteristics of the first audio stream; and obfuscating, by the video conference provider, one or more personally identifiable objects in the first video stream.

Example 12 is the method of any previous or subsequent example, wherein obfuscating, by the video conference provider, the one or more personally identifiable objects in the first video stream comprises: blurring a face of a first participant associated with the first client device in first video stream.

Example 13 is the method of any previous or subsequent example, wherein obfuscating, by the video conference provider, the one or more personally identifiable characteristics of the first audio stream comprises: modifying at least one of: a speaker's intonation; a speaker's pitch; a speaker's speech pattern; or a speaker's vocabulary.

Example 14 is the method of any previous or subsequent example, wherein the recording comprises the modified audio stream and the modified video stream as the first audio stream and the first video stream.

Example 15 is a non-transitory computer-readable medium comprising processor-executable instructions configured to cause one or more processors to: establish a video conference having a plurality of participants, each participant of the plurality of participants exchanging one or more audio or video streams via the video conference; receive, from a first client device associated with one of the plurality of participants, a first audio stream and a first video stream of the one or more audio or video streams; record, responsive to an indication from one of the plurality of participants, the one or more audio or video streams within a recording; receive, from the first client device, a personal privacy request; in response to the personal privacy request, modify the first audio stream in the recording; and store the least one of the first audio stream or the first video stream as modified in the recording.

Example 16 is the non-transitory computer-readable medium of any previous or subsequent example, wherein the one or more processors are configured to execute further processor-executable instructions stored in the non-transitory computer-readable medium to: perform speech recognition on the first audio stream.

Example 17 is the non-transitory computer-readable medium of any previous or subsequent example, wherein the processor is configured to execute further processor-executable instructions stored in the non-transitory computer-readable medium to: determine, based on the speech recognition performed on the first audio stream, a speech pattern; and modify the first audio stream to change the speech pattern.

Example 18 is the non-transitory computer-readable medium of any previous or subsequent example, wherein the one or more processors are configured to execute further processor-executable instructions stored in the non-transitory computer-readable medium to: generate, based in part on the speech recognition, a transcript of the one or more audio streams from the video conference; and remove, from the transcript, transcription of the first audio stream.

Example 19 is the non-transitory computer-readable medium of any previous or subsequent example, wherein the one or more processors are configured to execute further processor-executable instructions stored in the non-transitory computer-readable medium to: generate, based in part on the speech recognition, a transcript of the one or more audio streams from the video conference; and modify, in the transcript, a transcription of the first audio stream to modify one or more personally identifiable characteristics in the transcription.

Example 20 is the non-transitory computer-readable medium of any previous or subsequent example, wherein the one or more processors are configured to execute further processor-executable instructions stored in the non-transitory computer-readable medium to: provide, to the first client device, an replay of the first audio stream as modified in the recording.

That which is claimed is:

1. A system comprising:
   a non-transitory computer-readable medium;
   a communications interface; and
   a processor communicatively coupled to the non-transitory computer-readable medium and the communications interface, the processor configured to execute processor-executable instructions stored in the non-transitory computer-readable medium to:
   establish a video conference having a plurality of participants, each participant of the plurality of participants exchanging one or more audio or video streams via the video conference;
   receive, from a first client device associated with one of the plurality of participants, a first audio stream and a first video stream of the one or more audio or video streams;
   record, responsive to an indication from one of the plurality of participants, the one or more audio or video streams within a recording;
   receive, from the first client device, a personal privacy request;
   in response to the personal privacy request, modify at least one of the first audio stream or the first video stream in the recording; and
   store the at least one of the first audio stream or the first video stream as modified to the recording.

2. The system of claim 1, wherein the processor-executable instructions to modify the at least one of the first audio stream or the first video stream in the recording further cause the processor to execute further processor-executable instructions stored in the non-transitory computer-readable medium to:
   modify the first video stream after being stored in the recording.

3. The system of claim 2, wherein the processor-executable instructions to modify the first video stream in the recording further cause the processor to execute further processor-executable instructions stored in the non-transitory computer-readable medium to:
   obfuscate one or more objects in the first video stream on the recording.

4. The system of claim 1, wherein the processor-executable instructions to modify the at least one of the first audio stream or the first video stream in the recording further cause the processor to execute further processor-executable instructions stored in the non-transitory computer-readable medium to:
   erase the first audio stream from the recording.

5. The system of claim 1, wherein the processor-executable instructions to modify the at least one of the first audio stream or the first video stream in the recording further cause the processor to execute further processor-executable instructions stored in the non-transitory computer-readable medium to:
   cease recording the first audio stream in the recording during the video conference.

6. The system of claim 1, wherein the processor-executable instructions to modify the at least one of the first audio stream or the first video stream in the recording further cause the processor to execute further processor-executable instructions stored in the non-transitory computer-readable medium to:
   apply an audio obfuscation optimizer to the first audio stream to change at least one characteristic of the first audio stream.

7. The system of claim 6, wherein the at least one characteristic of the first audio stream comprises at least one of:
   speech intonation;
   speech pitch;
   speech pattern; or
   speech vocabulary.

8. A method comprising:
   establishing, by a video conference provider, a video conference having a plurality of participants, each participant of the plurality of participants exchanging one or more audio or video streams via the video conference;
   receiving, from a first client device associated with one of the plurality of participants, a first audio stream and a first video stream of the one or more audio or video streams;
   recording, by the video conference provider, responsive to an indication from one of the plurality of participants, the one or more audio or video streams within a recording;
   receiving, from the first client device, a personal privacy request;
   in response to the personal privacy request, modifying, by the video conference provider, at least one of the first audio stream or the first video stream in the recording; and storing the least one of the first audio stream or the first video stream as modified to the recording.

9. The method of claim 8, the method further comprises:
modifying, by the video conference provider, the first video stream during the video conference; and
generating, by the video conference provider, a modified audio stream based on the first audio stream and a modified video stream based on the first video stream.

10. The method of claim 9, further comprising:
transmitting, by the video conference provider, the modified audio stream and the modified video stream as the first audio stream and the first video stream to the plurality of participants during the video conference.

11. The method of claim 9, wherein generating, by the video conference provider, the modified audio stream and the modified video stream comprises:
obfuscating, by the video conference provider, one or more personally identifiable characteristics of the first audio stream; and
obfuscating, by the video conference provider, one or more personally identifiable objects in the first video stream.

12. The method of claim 11, wherein obfuscating, by the video conference provider, the one or more personally identifiable objects in the first video stream comprises:
blurring a face of a first participant associated with the first client device in first video stream.

13. The method of claim 11, wherein obfuscating, by the video conference provider, the one or more personally identifiable characteristics of the first audio stream comprises:
modifying at least one of:
a speaker's intonation;
a speaker's pitch;
a speaker's speech pattern; or
a speaker's vocabulary.

14. The method of claim 9, wherein the recording comprises the modified audio stream and the modified video stream as the first audio stream and the first video stream.

15. A non-transitory computer-readable medium comprising processor-executable instructions configured to cause one or more processors to:
establish a video conference having a plurality of participants, each participant of the plurality of participants exchanging one or more audio or video streams via the video conference;
receive, from a first client device associated with one of the plurality of participants, a first audio stream and a first video stream of the one or more audio or video streams;
record, responsive to an indication from one of the plurality of participants, the one or more audio or video streams within a recording;
receive, from the first client device, a personal privacy request;
in response to the personal privacy request, modify \at least one of the first audio stream or the first video stream in the recording; and
store the least one of the first audio stream or the first video stream as modified in the recording.

16. The non-transitory computer-readable medium of claim 15, wherein the one or more processors are configured to execute further processor-executable instructions stored in the non-transitory computer-readable medium to:
perform speech recognition on the first audio stream.

17. The non-transitory computer-readable medium of claim 16, wherein the processor is configured to execute further processor-executable instructions stored in the non-transitory computer-readable medium to:
determine, based on the speech recognition performed on the first audio stream, a speech pattern; and
modify the first audio stream to change the speech pattern.

18. The non-transitory computer-readable medium of claim 16, wherein the one or more processors are configured to execute further processor-executable instructions stored in the non-transitory computer-readable medium to:
generate, based in part on the speech recognition, a transcript of the one or more audio streams from the video conference; and
remove, from the transcript, transcription of the first audio stream.

19. The non-transitory computer-readable medium of claim 16, wherein the one or more processors are configured to execute further processor-executable instructions stored in the non-transitory computer-readable medium to:
generate, based in part on the speech recognition, a transcript of the one or more audio streams from the video conference; and
modify, in the transcript, a transcription of the first audio stream to modify one or more personally identifiable characteristics in the transcription.

20. The non-transitory computer-readable medium of claim 15, wherein the one or more processors are configured to execute further processor-executable instructions stored in the non-transitory computer-readable medium to:
provide, to the first client device, an replay of the first audio stream as modified in the recording.

* * * * *